(12) United States Patent
Inoue et al.

(10) Patent No.: US 6,502,888 B2
(45) Date of Patent: Jan. 7, 2003

(54) INSTRUMENT PANEL ARRANGEMENT FOR MOTOR VEHICLES

(75) Inventors: Masanori Inoue, Wako (JP); Koichi Fujita, Wako (JP); Koji Saitoh, Wako (JP); Shoji Abe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/898,654

(22) Filed: Jul. 3, 2001

(65) Prior Publication Data

US 2002/0003354 A1 Jan. 10, 2002

(30) Foreign Application Priority Data

Jul. 6, 2000 (JP) ........................................ 2000-204663
Jul. 7, 2000 (JP) ........................................ 2000-206008

(51) Int. Cl.[7] .............................................. B62D 25/14
(52) U.S. Cl. .............................. 296/72; 296/70; 180/90
(58) Field of Search ....................... 296/70, 72; 180/90

(56) References Cited

U.S. PATENT DOCUMENTS

| 4,614,316 | A | * | 9/1986 | Marvin et al. ................. 180/90 |
| 4,947,661 | A | * | 8/1990 | Yoshida ...................... 248/27.1 |
| 5,788,532 | A | * | 8/1998 | Takiguchi et al. ........... 439/374 |
| 6,132,154 | A | * | 10/2000 | Easter ....................... 296/72 X |
| 2002/0008399 | A1 | * | 1/2002 | Yasuta et al. ................. 296/72 |

\* cited by examiner

Primary Examiner—D. Glenn Dayoan
Assistant Examiner—Jason Morrow
(74) Attorney, Agent, or Firm—MacPherson Kwok Chen & Heid LLP

(57) ABSTRACT

In an instrument panel arrangement, a first permanent fixture is attached a second permanent fixture via a latch mechanism including a latch member engaging the first permanent fixture to the second permanent fixture and a handle member for selectively disengaging the latch member. The latch system allows the first and second permanent fixtures to be installed and removed in a simple manner, and this not only simplifies the assembly and maintenance work, but also facilitates the work in separating component parts for recycling when discarding or scrapping the automobile.

9 Claims, 7 Drawing Sheets

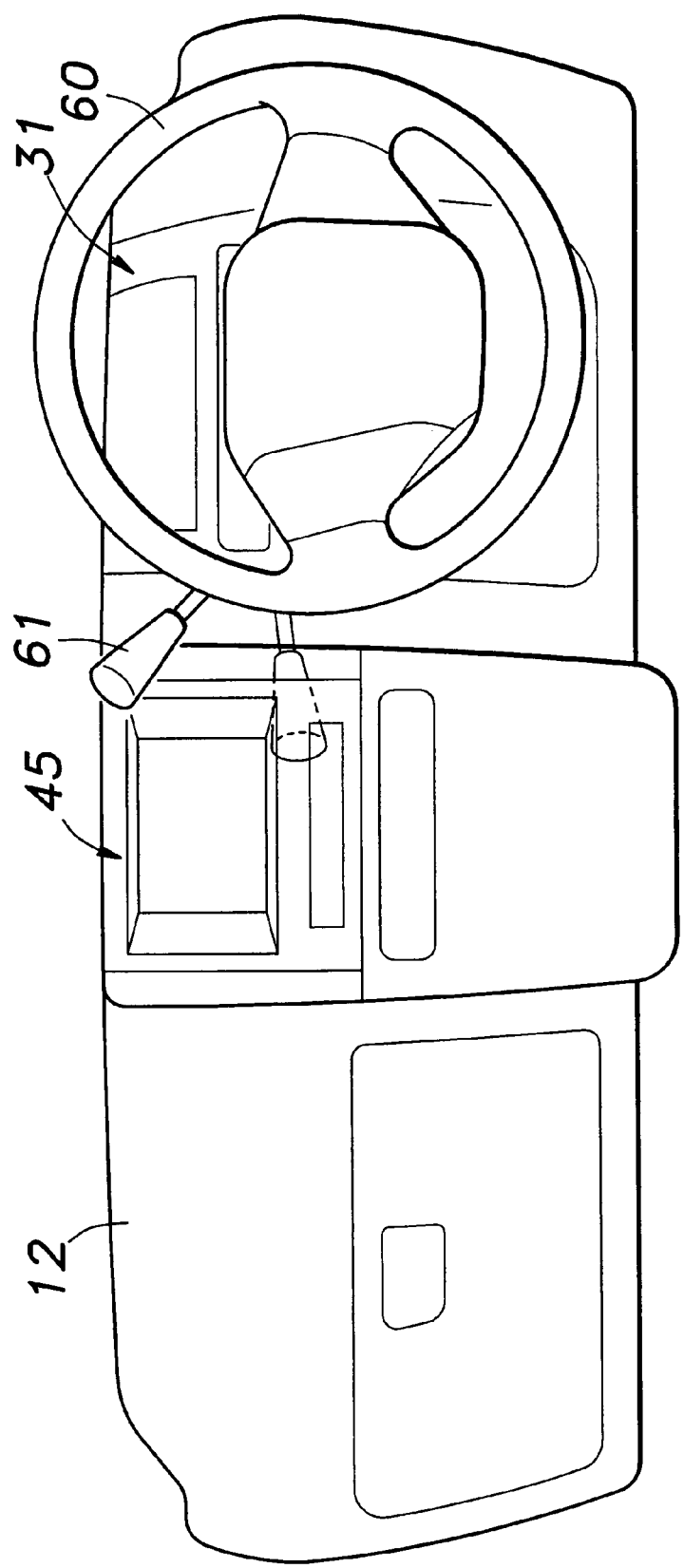

INSTRUMENT PANEL ARRANGEMENT FOR MOTOR VEHICLES

TECHNICAL FIELD

The present invention relates to an arrangement for an instrument panel for motor vehicles which is located in front of the vehicle operator in the passenger compartment to mount various instrument panel components such as an instrument display module and a control board module.

BACKGROUND OF THE INVENTION

Conventionally, an instrument panel is mounted to a vehicle body by using screws, threaded bolts or quick fasteners which can be used repeatedly for assembling rand, later, for removing for servicing and recycling purposes. Access to such fasteners is typically gained from the reverse side of the instrument panel, but the worker often experiences some difficulty in reaching the fasteners because the access is not always favorable.

This increases the cost of the vehicle due to the increase in the amount of assembly work that is required. Such fasteners are often more difficult to unfasten than fasten, and it means an even more increased difficulty in unfastening them for servicing purposes. Also, due to the increased awareness of the need for environmental protection, component parts made of different materials are required to be separated into different groups for the convenience of recycling, and it has become a major concern to facilitate the work in separating component parts for recycling.

BRIEF SUMMARY OF THE INVENTION

In view of such problems of the prior art, a primary object of the present invention is to provide an instrument panel arrangement for motor vehicles which is easy to assemble.

A second object of the present invention is to provide an instrument panel arrangement for motor vehicles which is easy to disassemble.

A third object of the present invention is to provide an instrument panel arrangement for motor vehicles which is adapted for recycling.

A fourth object of the present invention is to provide an instrument panel arrangement for motor vehicles which is easy to assemble and disassemble but discourages an attempt to disassemble by an unauthorized person.

According to the present invention, such objects can be accomplished by providing an instrument panel arrangement for motor vehicles, comprising: a first member integrally attached to a vehicle body; and a second member integrally attached to the first member, the first and second members being permanent fixtures to the vehicle body associated with an instrument panel; the second member being attached to the first member via a latch mechanism including a latch member engaging the first member to the second member and a handle member for selectively disengaging the latch member. Typically, the first member comprises a vehicle body member, and the second member comprises the instrument panel. In this case, the vehicle body member may comprise a member selected from a group consisting of a dashboard panel, a front cross beam, and a component attached thereto. Alternatively, the first member comprises an instrument panel, and second member comprises an instrument panel component.

In either case, both the assembling and disassembling work is simplified, and not only the assembling process is simplified but also the disassembling process for servicing and recycling purposes is simplified.

In the former case, to allow access to the handle member but to prevent unauthorized tampering, the handle member is preferably provided inside an opening provided in the instrument panel, the opening being adapted to be closed by an instrument panel component. Also, to ensure a proper registration and a structural integrity, the arrangement may further comprise a locating pin provided to one of the first and second members, and a hole for receiving the locating pin provided in the other of the first and second members.

In the latter case, to aid the assembling and disassembling work, the arrangement may further comprise a guide mechanism for guiding the instrument panel component toward a final position at which the latch mechanism retains the instrument panel component to the instrument panel. The instrument panel component may consist of a member selected from a group consisting of an instrument display module and a control board module. Also, to prevent unauthorized tampering, the guide mechanism for the instrument panel component may be adapted to cause an interference between the instrument panel component and a member selected from a group consisting of a steering wheel and a column shift lever when removing the instrument panel component.

BRIEF DESCRIPTION OF THE DRAWINGS

Now the present invention is described in the following with reference to the appended drawings, in which:

FIG. 9 is a front view of the instrument panel in a fully assembled state.

DETAILED DESCRIPTION OF THE PREFERRED EMBODIMENTS

Figure 1:
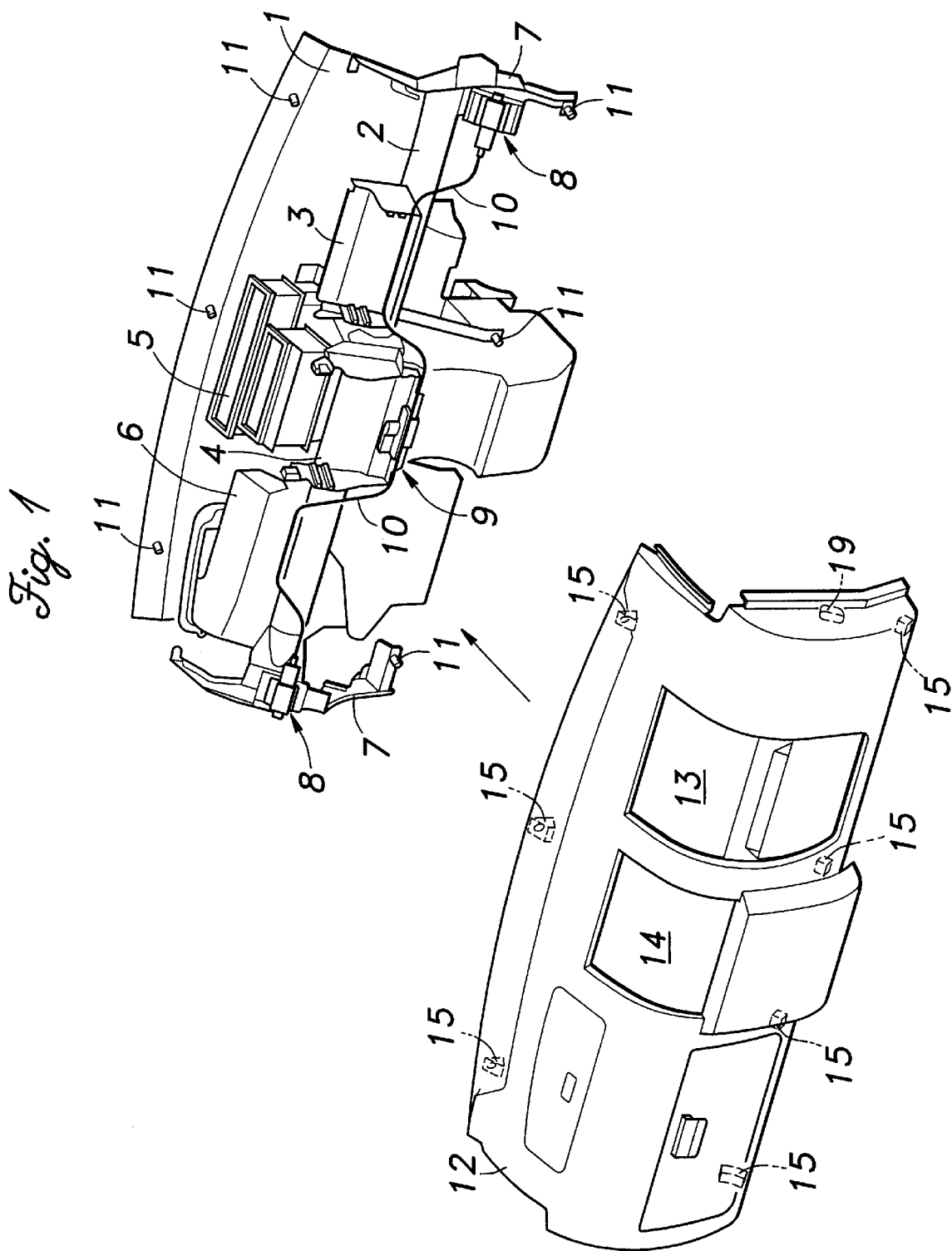
FIG. 1 is an exploded perspective view of an instrument panel and a dashboard panel embodying the present invention.

FIG. 1 is an exploded perspective view of an instrument panel assembly embodying the present invention. Referring to FIG. 1, a front cross beam 2 extends laterally across front side panel inners (not shown in the drawing) opposite an upper side of a dashboard panel 1 or a bulkhead panel separating a passenger compartment from an engine room. The front cross beam 2 supports a bracket 3 for supporting an instrument display module, a bracket 4 for supporting a control board module, an air conditioner duct 5, and an air bag module 6. Each end of the front cross beam 2 is provided with a mounting bracket 7 for attachment to the corresponding front side panel inner. A plurality of locating pins 11 are provided in appropriate parts of the upper part of the dashboard panel 1 and the various components attached to the front cross beam 2.

A latch mechanism 8 for securing an instrument panel 12 as described hereinafter is provided in each of the mounting brackets 7 on either lateral end of the front cross beam 2, and a control handle 9 for actuating the latch mechanisms 8 is attached to the control board module bracket 4 which is connected to each latch mechanism 8 via a push-pull cable 10 such as a Boden (trade name) cable.

The instrument panel 12 consists of a one-piece molded plastic member, and includes an instrument display module opening 13 in a right hand side part thereof, and a control board module opening 14 for mounting audio equipment and an air conditioner air outlet in a middle part thereof. The reverse surface of the instrument panel 12 is provided with a plurality of bosses 15 in appropriate parts thereof, each having an opening for receiving the corresponding locating pin 11.

Figure 2:
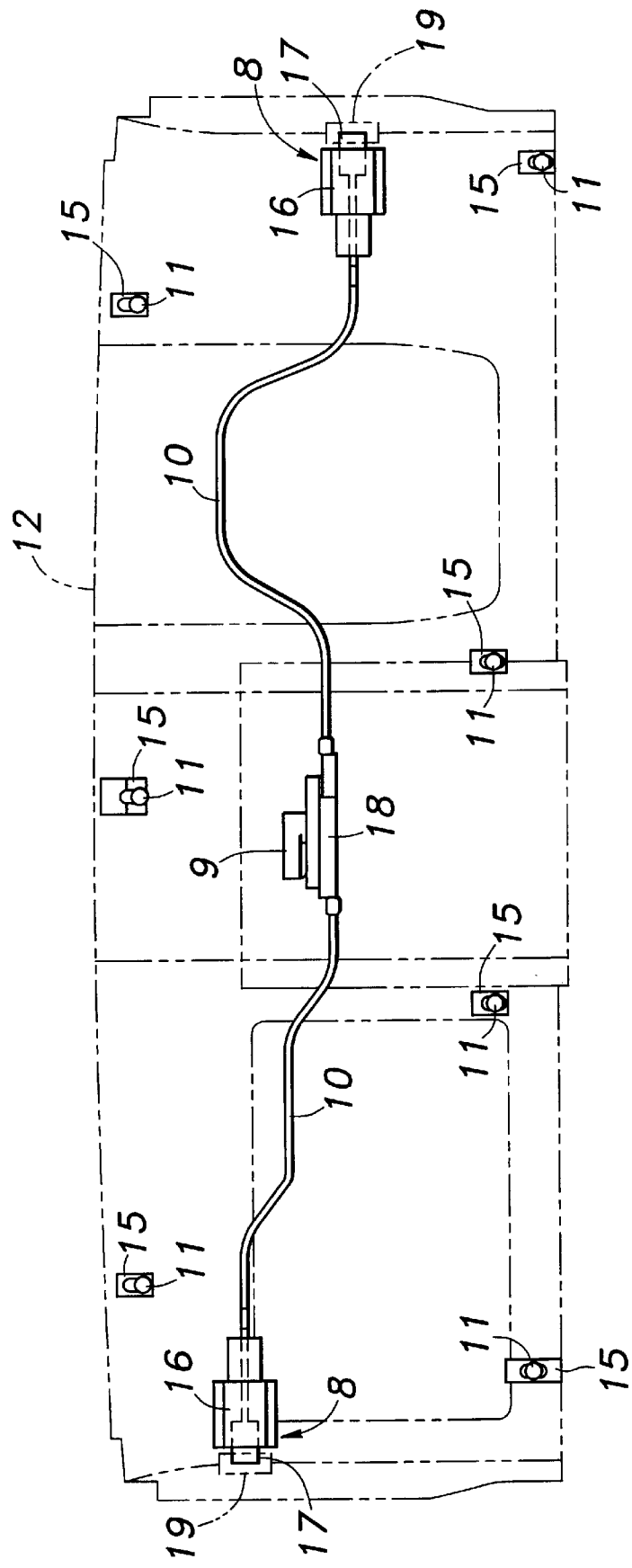
FIG. 2 is a see-through front view of the instrument panel.
Figure 3:
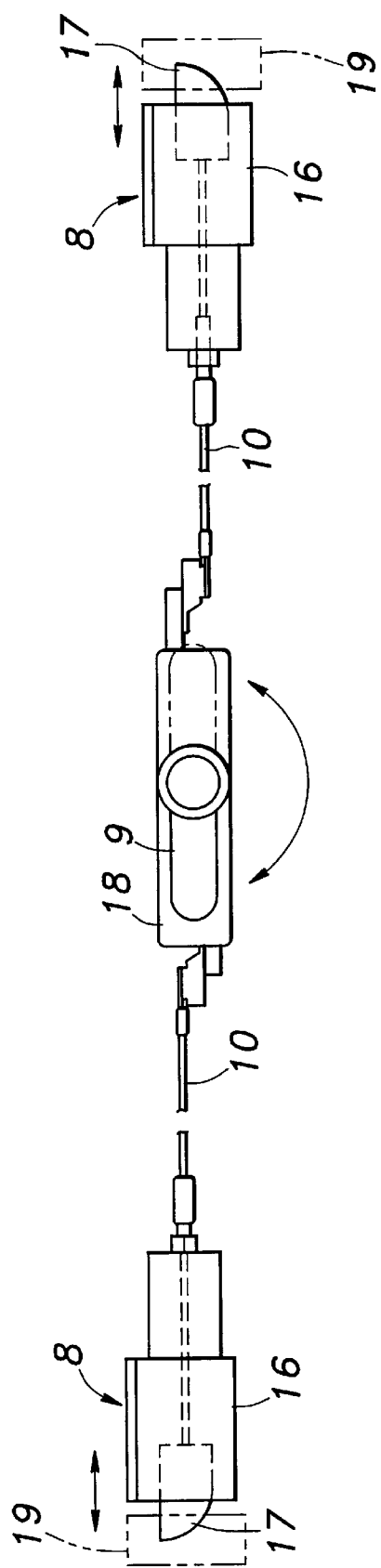
FIG. 3 is a fragmentary enlarged view of the latch mechanism as seen from the back of the instrument panel.

Referring to FIGS. 2 and 3, each latch mechanism 8 comprises a holder 16 attached to the mounting bracket 7, and a latch member 17 slidably received in the holder 16, in and out of the laterally outer end thereof. The control handle 9 is incorporated with a rotational/linear motion converting mechanism 18 which, for instance, may include an eccentric cam mechanism. Thus, as the control handle 9 is turned, the push-pull cable 10 extending from each side of the rotational/linear motion converting mechanism 18 is pushed or pulled depending on the direction of the rotation of the control handle 9, and this in turn causes the free end of the corresponding latch member 17 to move out of or into the holder 16.

A lost-motion mechanism is incorporated between each latch member 17 and the corresponding push-pull cable 10 although it is not shown in the drawing, and the latch member 17 is urged in the projecting direction by a spring member not shown in the drawings. Thus, as the control handle 9 is turned in the unlatching direction, the push-pull cable 10 is pulled, and each of the latch members 17 retracts into the holder 16 against the biasing force of the spring member. As the control handle 9 is turned in the latching direction, the push-pull cable 10 is pushed, and the latch member 17 is allowed to project out of the holder 16. The spring member also urges the latch member 17 out of the holder 16. Also, if the latch member 17 is subjected to an external force in the retracting direction, even when the push-cable 10 is in a position for projecting the latch member 17, the latch member 17 can be pushed back into the holder 16 against the urging force of the spring member owing to the action of the lost-motion mechanism.

When the instrument panel 12 is desired to be mounted to the dashboard panel 1, the control handle 9 is placed at the latch position, and the instrument panel 12 is pushed onto the dashboard panel 1 so that the locating pins 11 projecting from the dashboard panel 1 fit into the holes of the corresponding bosses 15 on the backside of the instrument panel 12.

As the instrument panel 12 is pushed further, the tapered surface of each latch member 17 is engaged by a striker member 19 projecting from the backside of the instrument panel 12, and this causes the latch member 17 to be retracted into the holder 16 against the urging force of the spring member. Once the latch member 17 rides over the striker member 19, the latch member 17 and striker member 19 are engaged to each other so as to firmly secure the instrument panel 12 to the dashboard panel 1 until the control handle 9 is turned in the unlatching direction to pull the push-pull cable 10 in the direction to retract the latch member 17 and disengage it from the striker member 19.

The access to the control handle 9 is provided by the instrument display module opening 14. However, in the fully assembled state of the instrument panel 12, the opening 14 is closed by an instrument display module, and this prevents any inadvertent or unauthorized operation of the control handle 9.

Figure 4:
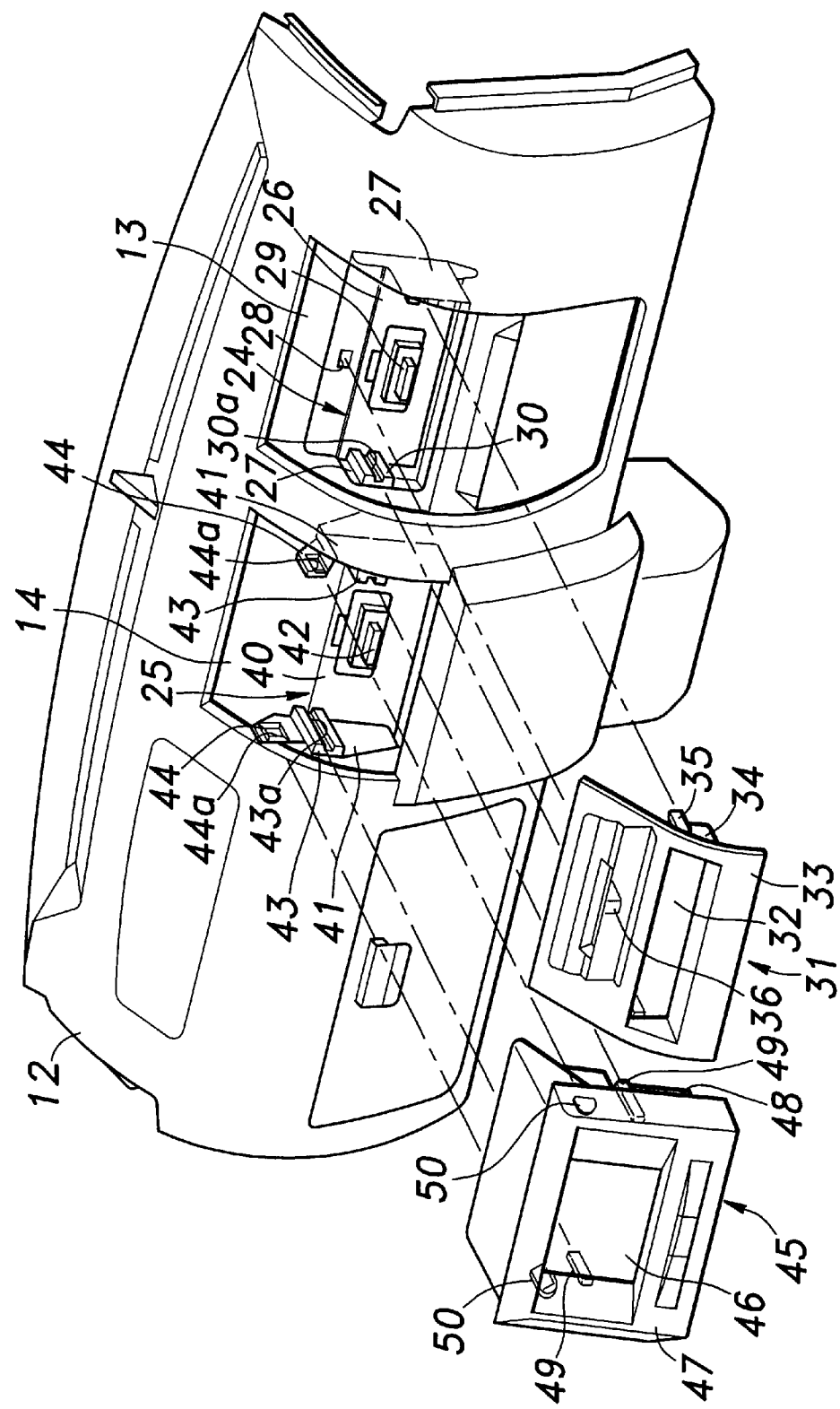
FIG. 4 is an exploded perspective view of the instrument panel and associated instrument panel components according to the present invention.

FIG. 4 is an exploded perspective view showing the instrument panel 12 and components that are attached to the instrument panel 12. An instrument display module support base 24 and a control board module support base 25 are attached to the backside of the instrument panel 12 around the openings 13 and 14 of the instrument panel 12. These support bases 24 and 25 are essentially made of stamp formed sheet metal pieces, and are placed inside the instrument panel 12 when the instrument panel 12 is attached to the dashboard panel 1.

The instrument display module support base 24 for supporting an instrument display module 31 comprises a front wall 26 spaced from the surface of the instrument panel 12 toward the dashboard panel 1 and a pair of side walls 27. The front wall 26 is centrally provided with a striker opening 28 in an upper part thereof for engaging a latch mechanism which is described hereinafter, and a connector 29 in a lower part thereof for connecting signal cables. The opposing surfaces of the side walls 27 are each provided with a fixed guide member 30 defining a substantially horizontal groove 30a.

The instrument display module 31 comprises an LCD panel 32 and a cover 33. The frame 34 of the instrument display module 31 comprises key members 35 extending in the fore-and-aft direction on either side thereof for engagement with the grooves 30a of the guide members 30, and a latch mechanism 36 which is adapted to cooperate with the striker opening 28 provided in the upper part of the front wall 26 of the support base 24.

Figure 5:
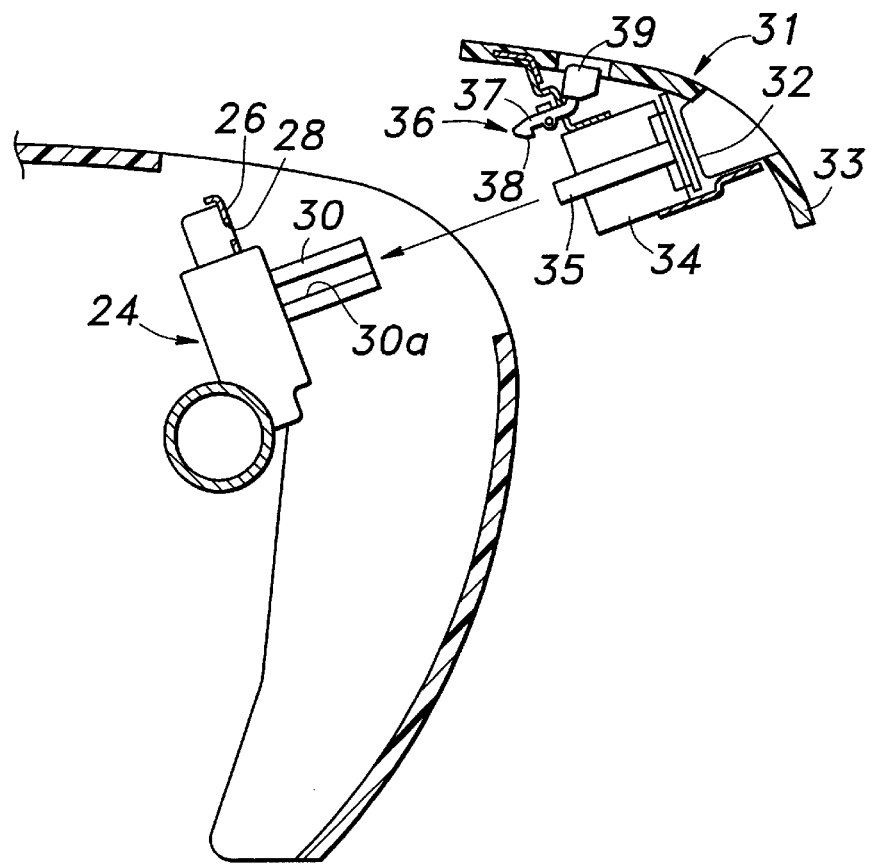
FIG. 5 is a fragmentary exploded sectional view of the mount structure for an instrument display module.
Figure 6:
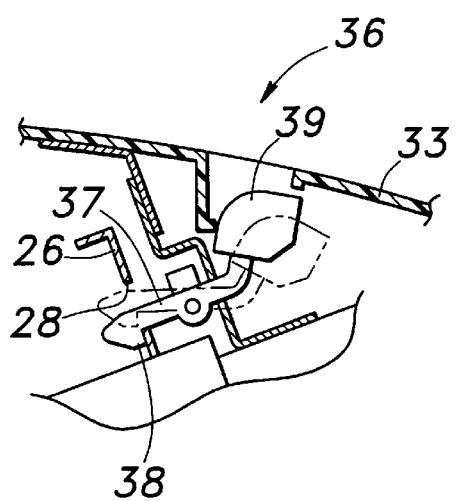
FIG. 6 is an enlarged fragmentary sectional view of the latch mechanism for the instrument display module.

The latch mechanism 36 of the instrument display module 31 comprises a lever member 37 which is pivotally supported by a laterally extending shaft at a middle part thereof so as to effect a rocking motion as best illustrated in FIGS. 5 and 6. The front end of the lever member 37 is provided with a pawl 38 which is adapted to be engaged by the striker opening 28, and the rear end thereof is provided with an operation knob 39. The lever member 37 is urged by a torsion coil spring or the like (not shown in the drawings) in the direction to raise the operation knob 39 to in the direction to keep the pawl 38 engaged by the striker opening 28.

The control board module support base 25 for supporting a control board module 45 comprises a front wall 40 spaced from the surface of the instrument panel 12 toward the dashboard panel 1 and a pair of side walls 41. The front wall 40 is centrally provided with a connector for connecting signal cables. The opposing surfaces of the side walls 41 are each provided with a fixed guide member 43 defining a substantially horizontal groove 43a, and a striker member 44 defining a striker opening 44a, one above the other.

The control board module 45 comprises an LCD panel 46 and a cover 47. The frame 48 of the control board module 45 comprises, on either side thereof, a pair of key members 49 extending in the fore-and-aft direction for engagement with the grooves 43a of the guide members 43, and a pair of latch mechanisms 50 which are adapted to cooperate with the striker openings 44a provided in the striker members 44 of the side walls 41 of the support base 25.

Figure 7:
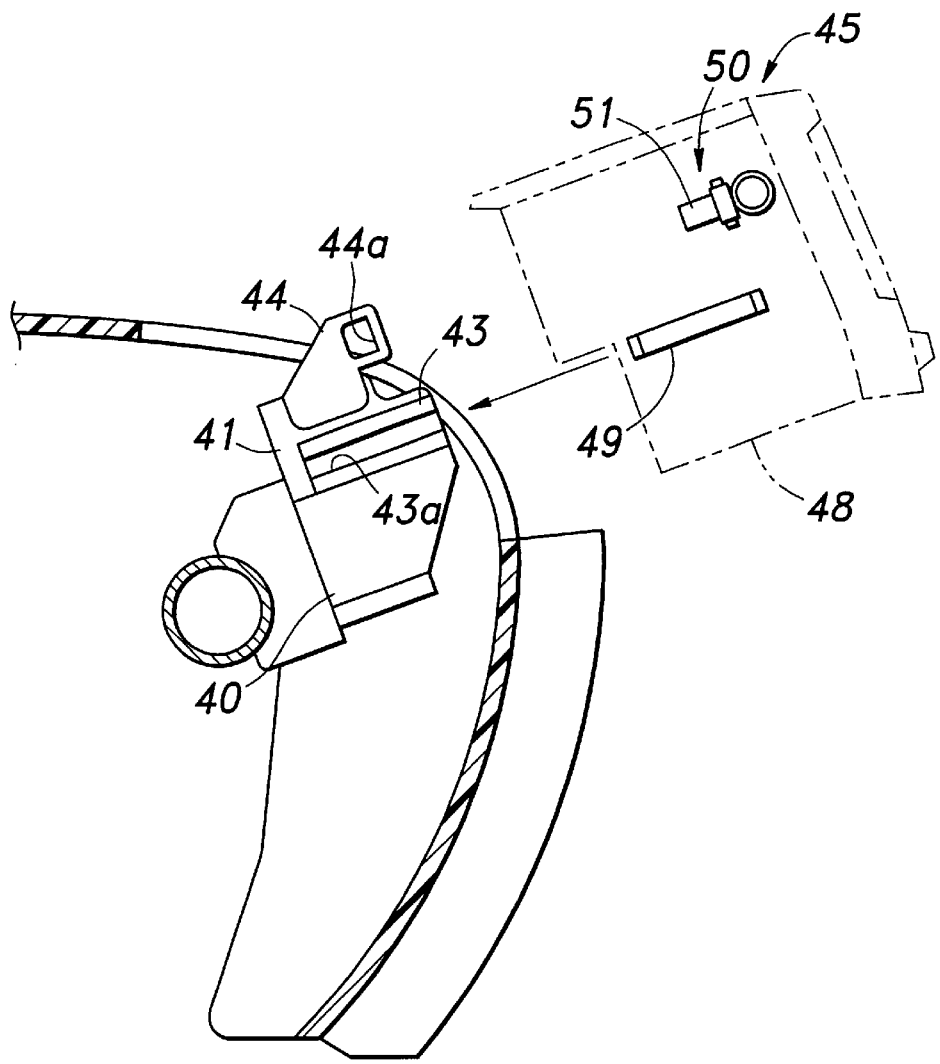
FIG. 7 is a fragmentary exploded sectional view of the mount structure for a control board module.
Figure 8:
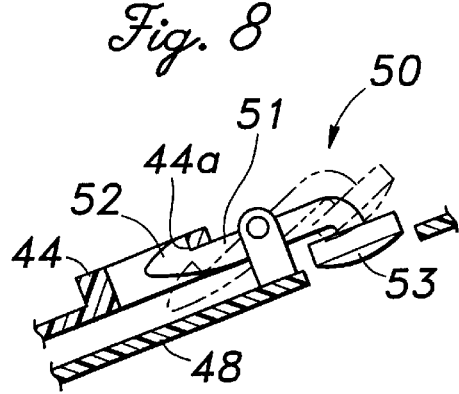
FIG. 8 is an enlarged fragmentary sectional view of the latch mechanism for the control board module.

Each of the latch mechanisms 50 of the control board module 45 is provided with a lever member 51 which is pivotally supported by a vertical shaft at a middle part thereof so as to effect a lateral rocking motion as best illustrated in FIGS. 7 and 8. The front end of the lever member 51 is provided with a pawl 52 adapted to be engaged by the striker opening 44a of the corresponding striker member 44, and the rear end thereof is provided with a control knob 53. The lever member 51 is resiliently urged by a torsion coil spring or the like in the direction to urge the pawl 52 outward or in the direction to keep the pawl 52 engaged by the striker opening 44a.

The instrument display module 31 is mounted to the support base 24 from outside the instrument panel 12. The module 31 is pushed forward or into the corresponding opening 13 of the instrument panel 12 with the front end of the key members 35 aligned with the rear ends of the guide grooves 30a of the guide members 30. Once the module 31 is fully pushed into the corresponding opening 13, the pawl 38 of the lever member 37 fits into the striker opening 8 of the striker member 6, and is kept engaged in this engaged position by the resilient force of the corresponding spring member. Thus, the module 31 is firmly retained in the corresponding opening 13 of the instrument panel 12. Thereafter, a plug at the free ends of cables extending from the module is engaged with the corresponding connector 29 to establish the necessary electric connection for the module 31.

The control board module 45 is mounted to the support base 25 from outside the instrument panel 12. The module 45 is pushed forward or into the corresponding opening 14 of the instrument panel 12 with the front end of the key members 49 aligned with the rear ends of the guide grooves 43a of the guide members 43. Once the module 45 is fully pushed into the corresponding opening 14, the pawl 52 of each lever member 51 fits into the striker opening 44a of the corresponding striker member 44, and is kept engaged in this engaged position by the resilient force of the corresponding spring member. Thus, the module 45 is firmly retained in the corresponding opening 14 of the instrument panel 12. Thereafter, a plug at the free ends of cables extending from the module 45 is engaged with the corresponding connector 42 to establish the necessary electric connection for the module 45.

When the module 31 or 45 is desired to be removed from the corresponding opening 13 or 14 of the instrument panel 12 for servicing or recycling purpose, simply by moving the control knob 39 downward in the case of the instrument display module 31 and the control knobs 53 inward in the case of the control board module 45 to disengage the pawl 38 or pawls 52 from the corresponding striker opening 28 or openings 44a, the module 31 or 45 can be pulled rearward out of the corresponding opening 13 or 14 of the instrument panel 12. Access to the control knobs 39 and 53 may be secured by providing openings in the instrument panel 12, and these openings may be normally closed by suitable plugs or caps to conceal them from the view of the vehicle operator.

Simplifying the removal of the instrument panel components may increase the risk of a theft. However, a steering wheel 60 and a column shift lever 61 which are mounted after the instrument display module 31 and control board module 45 are fully assembled interfere with the removal of the instrument display module 31 and control board module 45 as indicated in FIG. 9. A thief is not typically equipped with tools for removing the steering wheel 60 and column shift lever 61, but a mechanic working in a shop equipped with proper tools can be readily removed them without any difficulty.

The latch systems described above allow the instrument panel and instrument components to be installed and removed in a simple manner, and this not only simplifies the assembly and maintenance work, but also facilitates the work in separating component parts for recycling when discarding or scrapping the automobile.

Although the present invention has been described in terms of preferred embodiments thereof, it is obvious to a person skilled in the art that various alterations and modifications are possible without departing from the scope of the present invention which is set forth in the appended claims. For instance, although the fuel and oxidant for the fuel cells are described and claimed as consisting of gases throughout the text of this application, it should be understood that they may also consist of liquid without departing from the scope and spirit of this application.

What is claimed is:

1. An instrument panel arrangement for motor vehicles, comprising:
    a first member comprising a vehicle body member and integrally attached to a vehicle body; and
    a second member comprising an instrument panel and integrally attached to said first member;
    said second member being attached to said first member via a latch mechanism including a latch member engaging said first member to said second member and a handle member for selectively disengaging said latch member;
    said handle member being provided inside an opening provided in said instrument panel, said opening being adapted to be closed by an instrument panel component.

2. An instrument panel arrangement for motor vehicles according to claim 1, wherein said vehicle body member comprises a member selected from a group consisting of a dashboard panel, a front cross beam, and a component attached thereto.

3. An instrument panel arrangement for motor vehicles according to claim 1, further comprising a locating pin provided to one of said first and second members, and a hole for receiving said locating pin provided in the other of said first and second members.

4. An instrument panel arrangement for motor vehicles, comprising:
    a first member integrally attached to a vehicle body;
    a second member integrally attached to said first member, said first and second members being permanent fixtures to said vehicle body associated with an instrument panel, said second member being attached to said first member via a latch mechanism including a latch member engaging said first member to said second member and a handle member for selectively disengaging said latch member; and
    a locating mechanism including a locating pin provided to one of said first and second members and a hole for receiving said locating pin provided in the other of said first and second members.

5. An instrument panel arrangement for motor vehicles according to claim 4, wherein said first member comprises a vehicle body member, and said second member comprises said instrument panel.

6. An instrument panel arrangement for motor vehicles according to claim 5, wherein said vehicle body member comprises a member selected from a group consisting of a dashboard panel, a front cross beam, and a component attached thereto.

7. An instrument panel arrangement for motor vehicles according to claim 6, wherein said handle member is provided inside an opening provided in said instrument panel, said opening being adapted to be closed by an instrument panel component.

8. An instrument panel arrangement for motor vehicles, comprising:

- a first member comprising an instrument panel, and integrally attached to a vehicle body;
- a second member comprising an instrument panel component, and integrally attached to said first member, said second member being attached to said first member via a latch mechanism including a latch member engaging said first member to said second member and a handle member for selectively disengaging said latch member; and
- a guide mechanism for guiding said instrument panel component toward a final position at which said latch mechanism retains said instrument panel component to said instrument panel, said guide mechanism for said instrument panel component being adapted to cause an interference between said instrument panel component and a member selected from a group consisting of a steering wheel and a column shift lever when removing said instrument panel component.

9. An instrument panel arrangement for motor vehicles according to claim 8, wherein said instrument panel component consists of a member selected from a group consisting of an instrument display module and a control board module.

* * * * *